(12) United States Patent
Fairweather et al.

(10) Patent No.: US 10,543,622 B2
(45) Date of Patent: Jan. 28, 2020

(54) ROTATABLE FILTER SYSTEM AND METHODOLOGY

(71) Applicant: JPL Global, LLC, Moreno Valley, CA (US)

(72) Inventors: Mitch Fairweather, Nampa, ID (US); Stephen M. Curtis, Nampa, ID (US); Paul W. Guth, Menifee, CA (US); Randy Ott, Boise, ID (US)

(73) Assignee: JPL GLobal, llc, Moreno Valley, CA (US)

( * ) Notice: Subject to any disclaimer, the term of this patent is extended or adjusted under 35 U.S.C. 154(b) by 283 days.

(21) Appl. No.: 15/628,581

(22) Filed: Jun. 20, 2017

(65) Prior Publication Data

US 2017/0282407 A1 Oct. 5, 2017

Related U.S. Application Data

(63) Continuation-in-part of application No. 14/506,531, filed on Oct. 3, 2014, now Pat. No. 9,682,496, which
(Continued)

(51) Int. Cl.
*B28D 7/02* (2006.01)
*B24B 55/06* (2006.01)
(Continued)

(52) U.S. Cl.
CPC .......... *B28D 7/02* (2013.01); *B23D 47/025* (2013.01); *B23D 59/006* (2013.01);
(Continued)

(58) Field of Classification Search
CPC ....... B24B 27/02; B24B 27/065; B24B 55/06; B24B 55/10; B24B 55/102; B28D 7/02;
(Continued)

(56) References Cited

U.S. PATENT DOCUMENTS 2,407,046 A * 9/1946 Vokes ............... B01D 29/6476
210/415
3,089,167 A 5/1963 Jahn et al.
(Continued)

FOREIGN PATENT DOCUMENTS

RU 2096067 11/1997

OTHER PUBLICATIONS

International Search Report and Written Opinion for International Application No. PCT/US2018/038617 dated Oct. 18, 2018, 5 pages.

*Primary Examiner* — Eileen P Morgan
(74) *Attorney, Agent, or Firm* — Daniel Castro; Loza & Loza LLP

(57) ABSTRACT

Various aspects of an apparatus are disclosed. In a particular aspect, an apparatus comprising a cylindrical filter, a filter cleaning knob, and a filter cleaning flap is disclosed. Within such embodiment, the filter cleaning knob is configured to rotate the cylindrical filter. The filter cleaning flap is coupled to the cylindrical filter and configured to sequentially make contact with a plurality of pleated segments of the cylindrical filter as the filter cleaning knob is rotated.

9 Claims, 8 Drawing Sheets

Related U.S. Application Data is a continuation of application No. 12/497,390, filed on Jul. 2, 2009, now Pat. No. 8,869,786.

(60) Provisional application No. 61/152,574, filed on Feb. 13, 2009, provisional application No. 61/078,250, filed on Jul. 3, 2008.

(51) Int. Cl.
*B24B 55/10* (2006.01)
*B23Q 11/00* (2006.01)
*B28D 7/04* (2006.01)
*B24B 27/06* (2006.01)
*B23D 47/02* (2006.01)
*B23D 59/00* (2006.01)

(52) U.S. Cl.
CPC ...... *B23Q 11/0046* (2013.01); *B23Q 11/0067* (2013.01); *B24B 27/065* (2013.01); *B24B 55/06* (2013.01); *B24B 55/10* (2013.01); *B28D 7/046* (2013.01); *Y02P 70/171* (2015.11); *Y10T 83/207* (2015.04); *Y10T 83/7693* (2015.04); *Y10T 83/773* (2015.04); *Y10T 83/7726* (2015.04)

(58) Field of Classification Search
CPC .... B28D 7/046; B23D 47/025; B23D 59/006; B23D 59/007; B23Q 11/0046; B23Q 11/0067; Y10T 83/773; Y10T 83/207; Y10T 83/7726; Y10T 83/7693; Y02P 70/171
USPC ......................................................... 451/456
See application file for complete search history.

(56) References Cited

U.S. PATENT DOCUMENTS

| | | | |
|---|---|---|---|
| 3,808,750 A * | 5/1974 | Mann | A61C 13/12 433/25 |
| 3,808,751 A | 5/1974 | Mann | |
| 3,913,431 A | 10/1975 | Lambert | |
| 4,011,782 A | 3/1977 | Clark et al. | |
| 4,063,059 A | 12/1977 | Brolund et al. | |
| 4,201,256 A | 5/1980 | Truhan | |
| 4,214,493 A | 7/1980 | Elhaus | |
| 4,257,297 A | 3/1981 | Nidbella | |
| 4,485,712 A | 12/1984 | Gerber | |
| 4,549,728 A | 10/1985 | Odeau | |
| 4,576,072 A | 3/1986 | Terpstra et al. | |
| 4,706,326 A * | 11/1987 | Romani | A47L 5/365 15/314 |
| 4,887,219 A | 12/1989 | Strauser | |
| 4,957,630 A * | 9/1990 | Bratten | B01D 33/067 209/270 |
| 5,131,192 A * | 7/1992 | Cheng | A61C 3/025 144/252.2 |
| 5,271,123 A | 12/1993 | Teske | |
| 5,655,253 A | 8/1997 | Nevin | |
| 5,807,414 A * | 9/1998 | Schaefer | B23K 9/325 55/385.2 |
| 6,283,306 B1 * | 9/2001 | Nilsson | B01D 33/21 210/391 |
| 6,355,167 B1 * | 3/2002 | Wensauer | B01D 29/11 210/232 |
| 6,444,002 B1 | 9/2002 | Mai | |
| 6,470,778 B1 | 10/2002 | Kaye, Jr. et al. | |
| 6,510,772 B2 | 1/2003 | Brickner, Jr. et al. | |
| 6,595,196 B2 | 7/2003 | Bath | |
| 7,013,884 B2 | 3/2006 | Guth | |
| 7,216,572 B2 | 5/2007 | Keenan | |
| 7,223,161 B2 | 5/2007 | Kodani et al. | |
| 7,497,886 B2 * | 3/2009 | Walker | B04C 5/187 173/71 |
| 7,543,522 B2 | 6/2009 | Chen | |
| 8,082,825 B2 | 12/2011 | Butler | |
| 10,239,136 B2 * | 3/2019 | Guth | B23D 47/045 |
| 2004/0206220 A1 | 10/2004 | Keenan | |
| 2005/0205075 A1 * | 9/2005 | Guth | B23Q 11/0046 125/13.01 |
| 2006/0107633 A1 * | 5/2006 | Walker | B04C 5/187 55/385.1 |
| 2006/0201295 A1 * | 9/2006 | Jorgensen | B23D 59/006 83/100 |
| 2007/0017191 A1 | 12/2007 | Miller et al. | |
| 2008/0163492 A1 | 7/2008 | Johansson | |
| 2009/0007440 A1 * | 1/2009 | Soika | B23D 59/006 30/388 |
| 2009/0019710 A1 * | 1/2009 | Grossman | B01D 46/0075 30/390 |
| 2010/0307307 A1 * | 12/2010 | Butler | B23D 59/006 83/58 |
| 2011/0079207 A1 * | 4/2011 | Guth | B23D 45/16 125/13.01 |
| 2012/0118244 A1 | 5/2012 | Finch | |
| 2013/0283563 A1 * | 10/2013 | Fry | B01D 46/0075 15/347 |
| 2015/0047674 A1 * | 2/2015 | Goodman | B08B 1/008 134/10 |
| 2016/0051913 A1 * | 2/2016 | Witelson | B01D 29/23 210/143 |
| 2018/0093211 A1 * | 4/2018 | Takahashi | B01D 46/2403 |
| 2018/0116188 A1 * | 5/2018 | Lindner | F04D 7/045 |
| 2018/0229160 A1 * | 8/2018 | Witelson | B01D 29/6415 |

* cited by examiner

ROTATABLE FILTER SYSTEM AND METHODOLOGY

PRIORITY CLAIM

This application is a continuation-in-part of U.S. patent application Ser. No. 14/506,531, filed Oct. 3, 2014, entitled "CHOP SAW WITH DUST COLLECTION SYSTEM," which claims priority to and the benefit of U.S. patent application Ser. No. 12/497,390, filed Jul. 2, 2009, entitled "CHOP SAW WITH DUST COLLECTION SYSTEM," which claims priority to and the benefit of provisional U.S. patent application No. 61/078,250, filed on Jul. 3, 2008, entitled "COMBINATION CHOPSAW AND DUST COLLECTION SYSTEM," and provisional U.S. patent application No. 61/152,574, filed on Feb. 13, 2009, entitled "COMBINATION CHOPSAW AND DUST COLLECTION SYSTEM." Accordingly, the entire contents of each of the aforementioned patent applications are hereby expressly incorporated by reference.

BACKGROUND OF THE INVENTION

Field of the Invention

The present invention pertains generally to power masonry tools and related devices for cutting and grinding. More specifically, the present invention relates to power saws of the "cutoff" type and systems that further maximize containment of dust contaminant while cutting cinder block, concrete, brick, clay, stone, tile and the like.

Description of the Prior Art

Power saws of the "cut-off" variety have been known for some time that employ a rotating circular blade applied to a stationary workpiece, such as wood, masonry or stone materials. An early version of a radial saw was invented by Raymond De Walt in 1922. These types of saws further include what is known as a "chop saw" which may be used for cutting lengths of pipe, steel, and other masonry objects. The chop saw comprises a motor coupled to a circular blade (or grinding wheel) pivotally supported for manual arcuate movement relative to a supporting surface such as a worktable.

An example of systems and methods comprising a chop saw are disclosed in U.S. Pat. No. 7,543,522 entitled "Adjustable Fence Assembly for Chop Saw," to Chen, which is hereby incorporated by reference in its entirety. Some additional features known for chop saws include compounding the blade to change its angle with respect to the horizontal plane; or a sliding compound feature so that the blade can make larger cuts relative to a circular blade diameter. Some chop saws further employ a laser guide such as the configuration disclosed in U.S. Pat. No. 4,257,297 entitled "Circular Saw with Visual Cut Line Indicator," to Nidbella, which is hereby incorporated by reference in its entirety.

Also known, is a problem of uncontrolled release of and exposure to airborne dust and particulate matter resulting from cutting a workpiece. Accordingly, government agencies such as the Occupational Safety and Health Administration (OSHA) have promulgated safety and health requirements for wet and dry cutting. The California Occupational Safety and Health Act of 1973 (Cal/OSHA) requires employers to provide a safe and healthful work place and gives Cal/OSHA regulatory jurisdiction over all public and private employers in California. Henceforth, employers must be compliant with all regulations set forth in Title 8 of The California Code of Regulations. In addition to health issues, the dust by-products present a clean-up challenge, even if all individuals in a contained environment have donned respirators.

Development of wet cutting devices and methods is one solution to dust abatement. In doing so, water is applied at a blade cutting edge where dust is entrained to a fluid and directed to a holding area. While most wet cutting methods work relatively well, they create additional problems of waste water pollution and environmental concerns. Further, the slurry created will adhere to cutting tool materials and components that also require periodic cleaning.

Many prior art solutions have been proposed that specifically employ dry means to control dust. Examples of such designs include, "Cutting And Dust Collecting Assembly," by Johansson, U.S. Pat. App. Pub. No. 2008/0163492, "Cutting Apparatus with Dust Discharging," to Kodani et al., U.S. Pat. No. 7,223,161, "Dust-Free Masonry Cutting Tool," to Bath, U.S. Pat. No. 6,595,196, "Dust Collector for A Power Tool," by Miller et al., U.S. Pat. Pub. No. 2007/0017191, to name a few, each of which are hereby incorporated by reference in their entireties. Such solutions generally may be suitable for their general purposes however none of these solutions are applicable for a chop saw. Yet another similar device was proposed by one of the present inventors, Guth entitled "Dust Collection System for A Masonry Saw," U.S. Pat. No. 7,013,884, and assigned to Masonry Technology Incorporated, which is hereby incorporated by reference in its entirety. This dust abatement design is applicable to a masonry chop saw; however this design is not easily portable and requires a separate hook up to a vacuum system.

In light of the above, it is an object of the present invention to provide a Chop Saw with Dust Collection that is highly portable and lighter in weight as compared prior art solutions. More specifically, it is an object of the present invention to provide a masonry chop saw that integrates dust collection to a single portable unit. It is still a further object of the present invention to provide a dry dust collection design that is easily cleaned. It is still further an object of the present invention to provide a design that includes a variety of innovative features over prior designs.

BRIEF SUMMARY OF THE INVENTION

The present invention specifically addresses and alleviates the above mentioned deficiencies, more specifically, the present invention, in a first aspect, is directed to a cut off saw comprising: a worktable for supporting a work piece; a rotatable arm fixed to a circular saw blade and pivotably secured to the worktable; a center slot carved out of the worktable axially aligned to the circular saw blade; a vacuum apparatus at an interior of the worktable, the vacuum apparatus providing negative pressure with respect to atmosphere at the center slot and collecting dust from the work piece created as a byproduct from use of the cut off saw.

The invention embodiment is additionally characterized in that worktable further comprises: a saw motor mechanically coupled to a circular saw blade; an upper housing; and a lower dust bin connected below the upper housing, the upper housing and lower dust bin each including a front panel, a back panel and first and second lateral sides, wherein the upper housing further comprises a lateral partitioning wall extending from first and second later sides, the lateral partitioning wall defining a suction chamber below the center slot, and wherein the upper housing further comprises a transverse partitioning wall defining both a vacuum motor chamber and a tilter chamber.

The invention embodiment is additionally characterized wherein each of the upper housing front panel and upper housing back panel further comprises a lifting handle, each of the lifting handles comprising an indentation in the upper housing front and back panels. In addition to the center slot, the worktable further comprises a plurality of blade slots angularly aligned to the center slot.

The cut off saw is further characterized wherein the filter chamber comprises: an access panel covering an area carved out of the first lateral side; a filter cleaning knob connected to a first filter end cap via a connection bolt, the connection bolt penetrating a hole in the access panel; a panel bushing providing translational and rotational support to the connection bolt; a second filter end cap, the first and second filter end caps together securing ends of a cylindrical media tilter; a vacuum suction tube connected to the vacuum apparatus, the vacuum tube penetrating the transverse partitioning wall; and an annular rim protrusion extending from the vacuum suction tube, the annular rim protrusion mating with the second filter end cap via a gasket and a bearing, the second filter end cap further comprising a bearing seat acting as an abutment to the bearing.

Still further, the invention embodiment is characterized wherein the upper housing comprises a lower rim, the lower rim comprising a groove around a perimeter thereof, and wherein the lower dust bin further comprises an upper rim, the upper rim comprising a groove around a perimeter thereof, and wherein the upper and lower rims comprising grooves are matingly and removably connected to each other.

Yet further, the invention embodiment is characterized wherein the lower dust bin first and second lateral sides each comprise a lifting handle, the lifting handles each comprising an indentation in the first and second lateral sides, respectively; and wherein the lower dust bin further comprises a latch for securing the lower dust bin to the upper housing.

In a second aspect, the invention is a cut off saw comprising: a worktable for supporting a work piece; a saw motor mechanically coupled to a circular saw blade; a rotatable arm fixed to the circular saw blade and pivotably secured to the worktable; a filter chamber at an interior to the worktable, the filter chamber comprising: a cylindrical media filter; and a vacuum tube coupled to an interior of the cylindrical media filter providing negative pressure with respect to atmosphere to said interior of the cylindrical media filter.

The cut off saw in this embodiment may be further characterized in that the worktable further comprises: a center slot carved out of the worktable axially aligned to the circular saw blade; and a plurality of blade slots angularly aligned to the center slot. Further, the filter chamber further comprises a filter cleaning flap secured to a lateral partitioning wall at an interior of the filter chamber, the cylindrical filter media having a plurality pleated segments about a cylindrical surface, wherein the filter cleaning flap contacts the pleated segments when the filter cleaning knob is rotated. Also, the filter chamber further comprises: an access panel covering an area carved out of the first lateral side; and a filter cleaning knob connected to a first filter end cap via a connection bolt, the connection bolt penetrating a hole in the access panel. Still further, the filter chamber further comprises: a panel bushing providing translational and rotational support to the connection bolt; and a second filter end cap, the first and second filter end caps together securing ends of a cylindrical media filter. Yet still further, the filter chamber further comprises: a vacuum suction tube connected to the vacuum apparatus, the vacuum tube penetrating the transverse partitioning wall; and an annular rim protrusion extending from the vacuum suction tube, the annular rim protrusion mating with the second filter end cap via a gasket and a bearing, the second filter end cap further comprising a bearing seat acting as an abutment to the bearing. To facilitate portability of the cut off saw, the invention additionally comprises two or more wheels.

In a third aspect, the invention may be characterized as a method for cutting masonry objects comprising the steps of: mounting a circular saw blade pivotably with respect to a worktable; carving out a center slot in the worktable aligned to the circular saw blade; aligning a plurality of side slots at an angle to the center slot; imparting a negative pressure with respect to atmosphere to an interior of the worktable; and collecting dust through the center slot and the side slots from the work piece created as a byproduct from use of the circular saw blade.

The method herein may be additionally characterized as comprising: providing start-lip current to a first motor; providing start-up current to a second motor sequentially to minimize undesirable current surges; providing a cylindrical filter below the worktable; and filtering the dust from air passing through the cylindrical filter. The method additionally comprises pleating the cylindrical filter thereby increasing usable surface area of the cylindrical filter.

Still further, the method for cutting masonry objects herein may be characterized as comprising: contacting a filter cleaning flap to the cylindrical filter; rotating a filter cleaning knob; clearing dust from the cylindrical filter; and collecting dust in a dust bin located at an area below the worktable. Also the method includes connecting a vacuum tube to a center area of the cylindrical filter; imparting a negative pressure with respect to atmosphere to a center area of the cylindrical filter; and exhausting filtered air to a lateral side of the worktable. Another method step includes providing a plurality of lifting handles at lateral sides of the worktable.

In yet another aspect of the disclosure, an apparatus comprising a cylindrical filter, a filter cleaning knob, and a filter cleaning flap is disclosed. Within such embodiment, the filter cleaning knob is configured to rotate the cylindrical filter. The filter cleaning flap is coupled to the cylindrical filter and configured to sequentially make contact with a plurality of pleated segments of the cylindrical filter as the filter cleaning knob is rotated.

While the apparatus and method has or will be described for the sake of grammatical fluidity with functional explanations, it is to be expressly understood that the claims, unless expressly formulated under 35 USC § 112, or similar applicable law, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC § 112 are to be accorded full statutory equivalents under 35 USC § 112, or similar applicable law. The invention can be better visualized by turning now to the following drawings wherein like elements are referenced by like numerals.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DETAILED DESCRIPTION OF THE PREFERRED EMBODIMENTS

Figure 1:
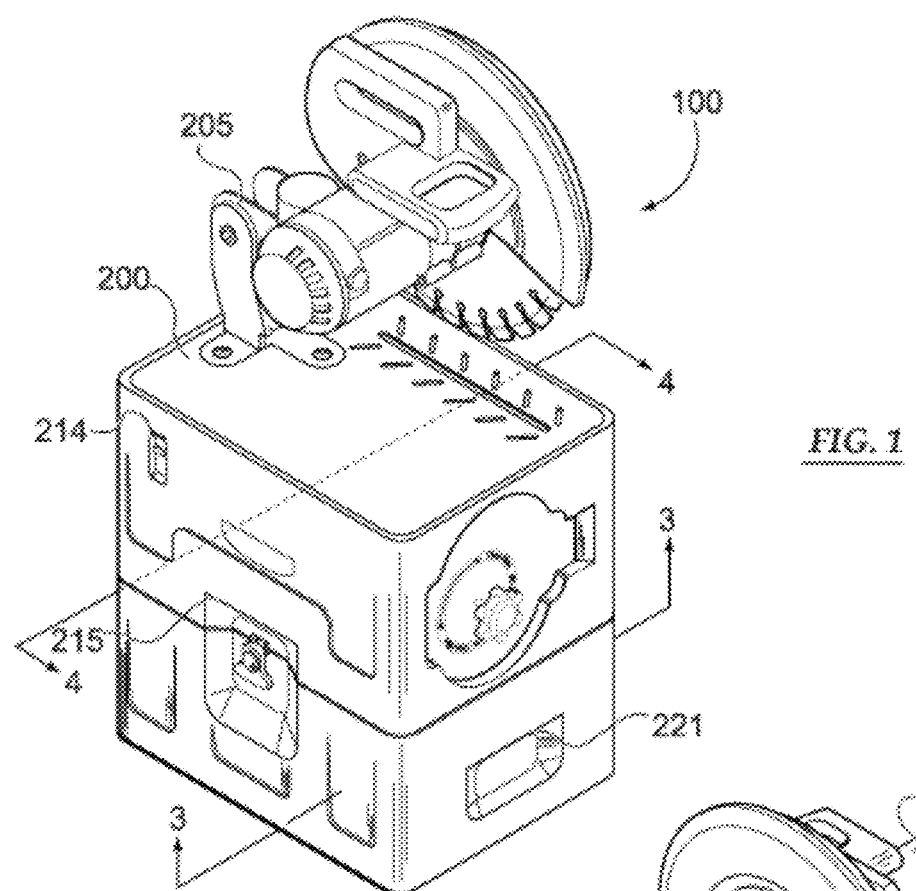
FIG. 1 is a perspective view of a preferred chop saw embodiment of the present invention.

Referring initially to FIG. 1, a preferred embodiment 100 comprises a cut-off type saw which is configured to cut masonry, and more specifically stones, bricks, pavers, and other masonry items. It should be understood that inventive concepts herein can also apply to woodworking circular saws and additionally saws for cutting plastic and roofing. The dust collection system 100 of the invention works in connection with a specifically configured saw 201, with a unique cutting table 200 and dust collector arrangement. The saw may be a cut-off saw or a chop saw, which has a circular toothed blade 201 or grinding wheel, and which rotates in a vertical plane of rotation as shown. The cut-off saw is further mounted on a pivotable arm 205 which allows the saw to be raised and lowered from a non-cutting position onto a cutting position so that the blade contacts a masonry work piece 420, and is lowered through the work piece 420 as the saw blade cuts.

In the FIG. 1 embodiment, saw 201 is shown coupled to a saw motor 204. It should be further appreciated that a similar circular saw could be coupled to a belt or pulley system for driving the saw 201. Still further, saw 201 is provided with a cutting table 200 which includes a blade center slot 202. As the cutting blade passes through the work piece, the blade continues until it enters the center slot 202; and additionally passes through the surface of the cutting table 200 into the slot 202. Cutting table 200 should be broadly construed as a substantially flat structure supporting a workpiece.

As circular blade 201 teeth engage the work piece 420 (FIG. 4), dust and particulate matter 410 are ejected from the work piece in various directions. A negative pressure provided by vacuum apparatus 321 (FIG. 3) causes air to flow in a downward direction thereby curtailing outward dispersion of the dust and particulate matter 410. In conventional prior art systems, the saw blade 201 would not pass through a blade slot, and thus ejected material would strike the cutting table and be collected after striking the cutting table. In the saw and dust collection system 100 of the present invention, a powerful flow of air is directed past the cutting blade 201, through center slot 202 and angled side slots 203 and into a filter chamber 310 below the cutting table 200. Also importantly, a flow of air is provided to remove dust at the instant the workpiece 420 is contacted by the saw blade 20] and throughout the cutting thereof.

Figure 2:
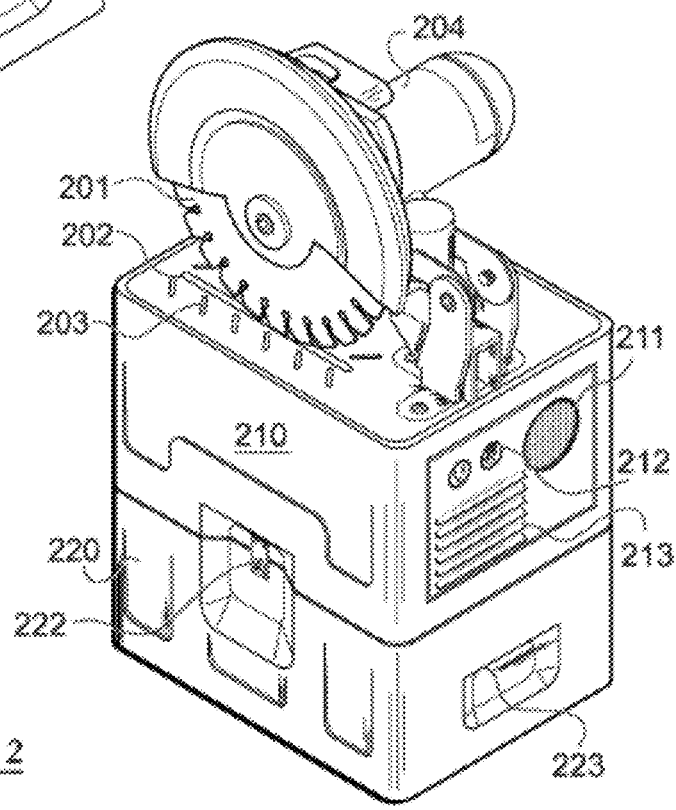
FIG. 2 is a rear perspective view of a the invention embodiment illustrated in FIG. 1.

With reference to FIG. 2, a rear perspective view of the present invention is shown. Exhaust port 211 is provided for discharge of filtered air 330. Air vents 213 provide for ventilation and heat transfer from vacuum apparatus 321. Lifting handles 221, 223 are further provided on first and second lateral sides to assist portability of the unit 100. Electrical connections 212 allow for external power to be supplied to the device 100 as shown.

In a preferred embodiment system 100 additionally comprises two motors 204, 321; a first 204 that drives the saw blade 201 and a second 321 that provides a prime mover for air flow. The saw and collection system 100 of the present invention may further include a time delay relay associated with power switch 214. When the saw and collection system is switched on, a first of two loads 204, 321 is engaged for a pre-determined period of time as designed into the time delay relay. Subsequently, a second of the two electrical loads 204, 321 is engaged. By staggering the two starting current surges, the peak load on the electrical system is reduced. Additionally, this will reduce a likelihood that the system 100 current surge causes a circuit breaker to be tripped.

Figures 7A, 7B:
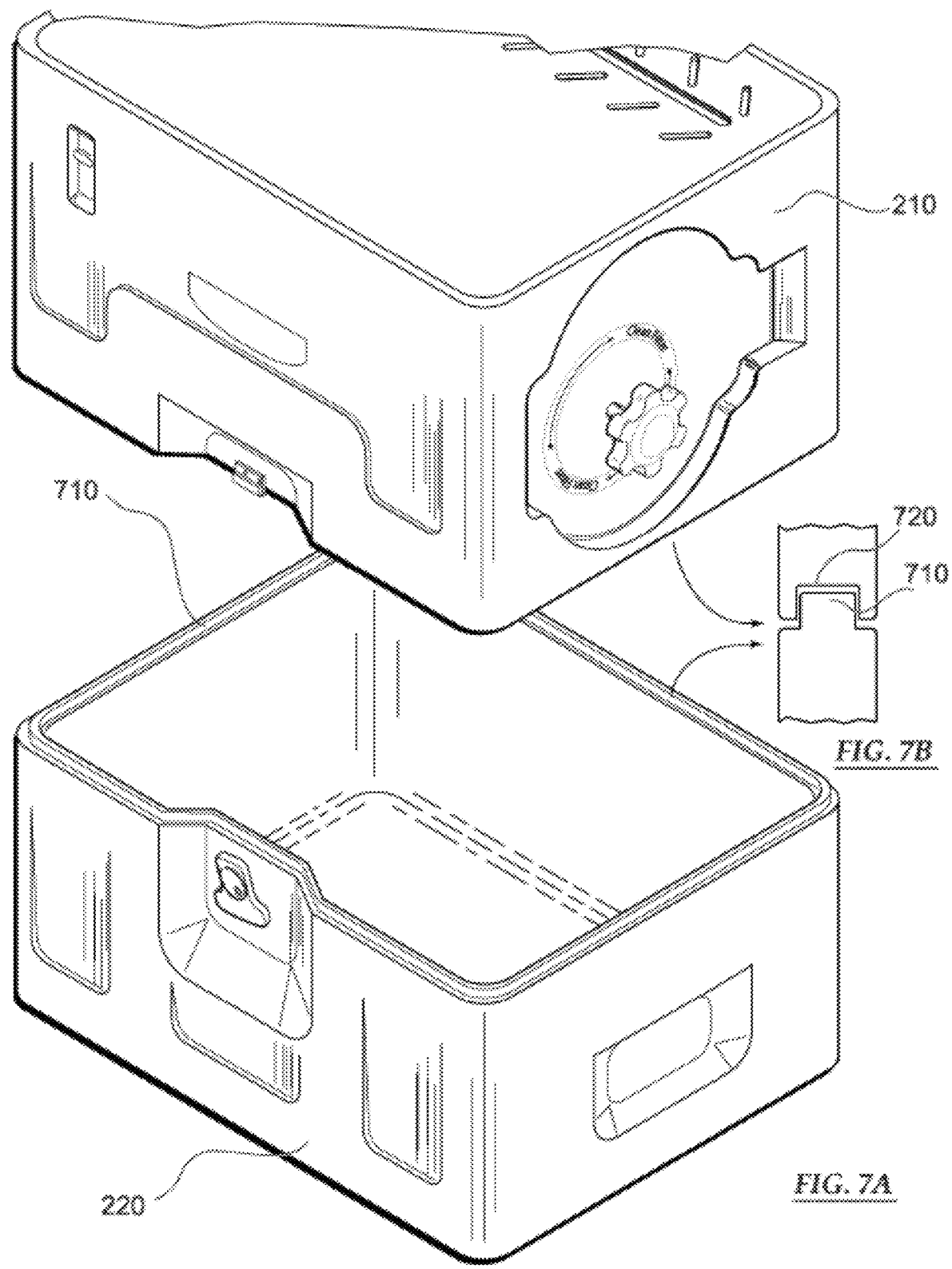
FIG. 7A and FIG. 7B illustrate how an upper housing and a lower dust bin relate to one another.

Also as shown in FIG. 1 and in FIG. 2, the worktable 200 has two separable units, namely upper housing 210 and lower dust bin 220. In addition to lifting handles 221, 223 on lateral sides, lifting handles 215 are provided on a front and a back of the unit 100 to also serve as hand holds for a user transporting the device. Latch 222 is provided to secure upper housing 210 to lower dust bin 220 also as shown in FIG. 7A and FIG. 7B.

Figure 3:
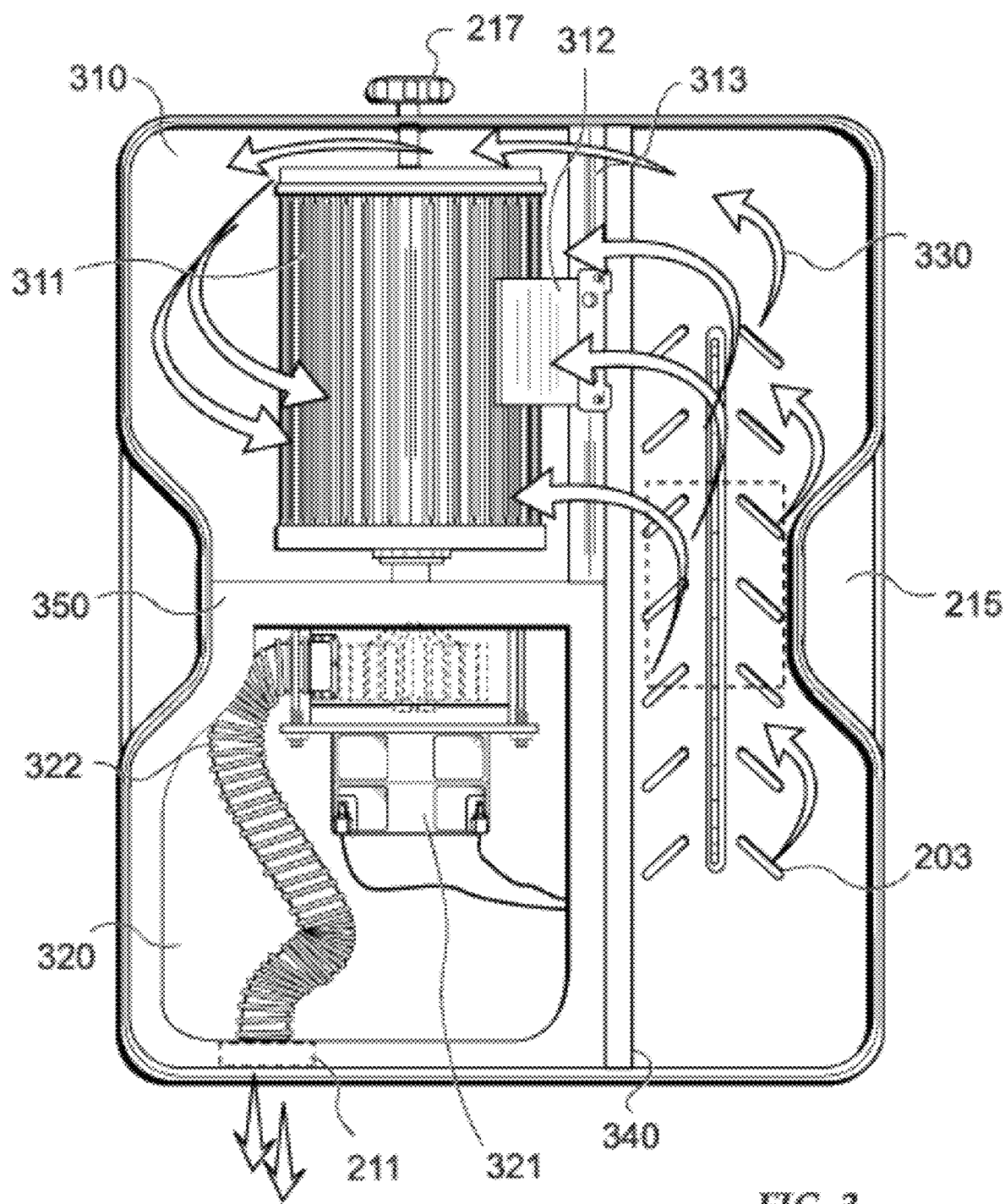
FIG. 3 is cross-sectional view of the invention embodiment as taken along line 3-3 in FIG. 1.

With reference to FIG. 3, a sectional view taken along line 3-3 in FIG. 1 is shown. Particulate matter 410 from workpiece 420 is drawn through center slot 202 and angled side slot 203. It should also be appreciated that side slot could be aligned parallel to the center slot 202 and at right angles thereto. Air containing dust 410 flows as shown by directional arrows 330 around partitioning wall 340. Dust 410 is fmlher filtered from the air through cylindrical pleated filter 311. Some of the dust and particulate matter will fall to dust bin 220 and some will be trapped by the filter. Filter cleaning flap 312 is provided connected to a ledge 313 adjacent to partitioning wall 340. The cleaning flap 312 will assist in clearing the cylindrical filter 311 when a user rotates knob 217. Translational wall 350 serves to separate filter chamber 310 from vacuum chamber 320. Exhaust hose 322 is shown in the vacuum chamber 320 for exhausting air to an exterior of the device 100. The vacuum apparatus 321 may use various types of motors to generate negative pressure and CFM to include blower motor, centrifugal fan, squirrel cage fan, propeller fan, or any other conventional moving device.

Figure 4:
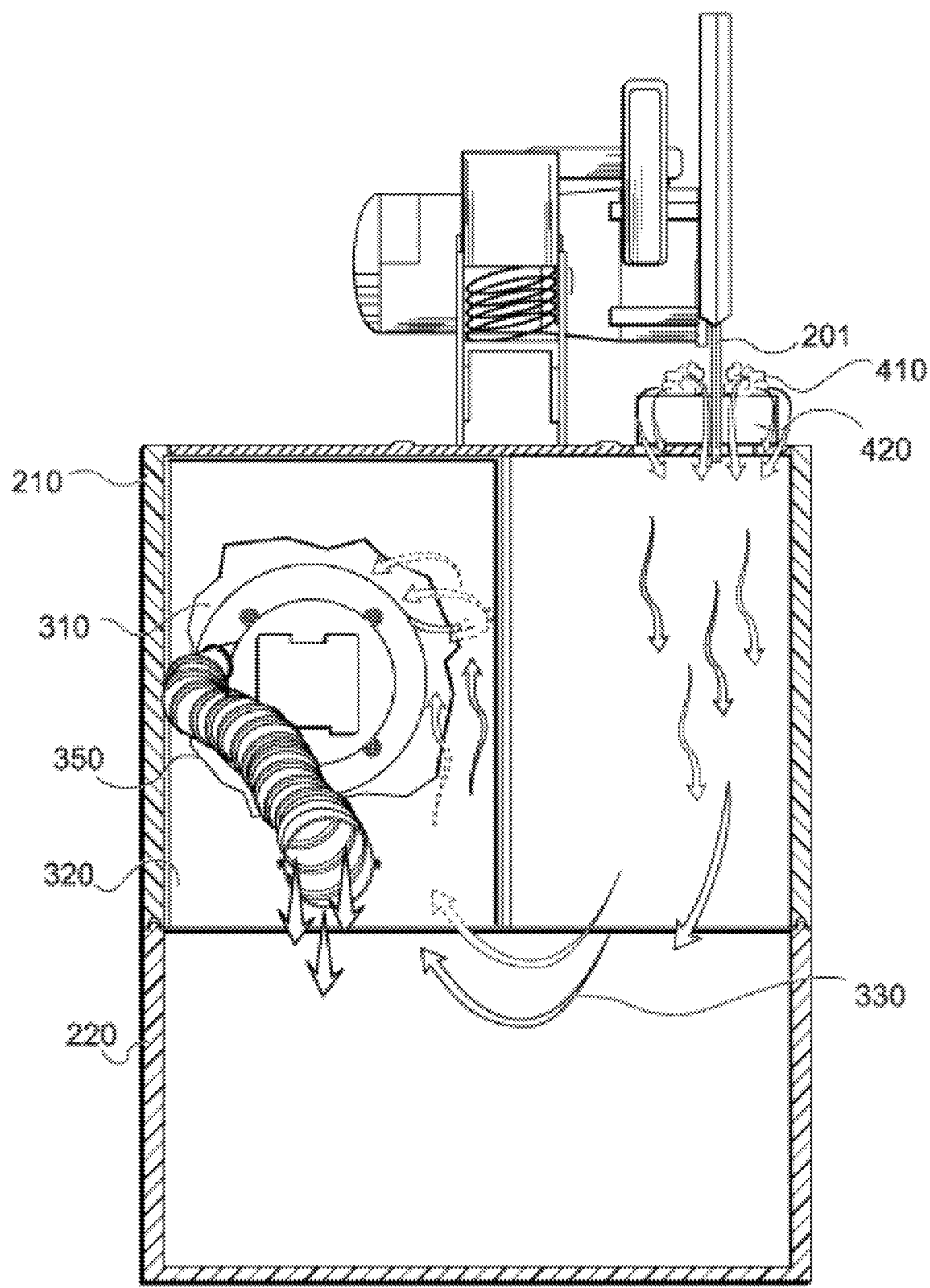
FIG. 4 is a cross-sectional view of the invention embodiment as taken along line 4-4 in FIG. 1.

FIG. 4 similarly shows the flow of air with directional arrows 330 as a sectional view along line 4-4 of FIG. 1. A cutaway in translational wall 350 reveals filter compartment 310. It will be appreciated that other configurations for filter chamber 310 and vacuum chamber 320 could be well within the scope of the present invention, such as, for example the filter chamber 310 configured directly below slots 202, 203.

Figure 5A:
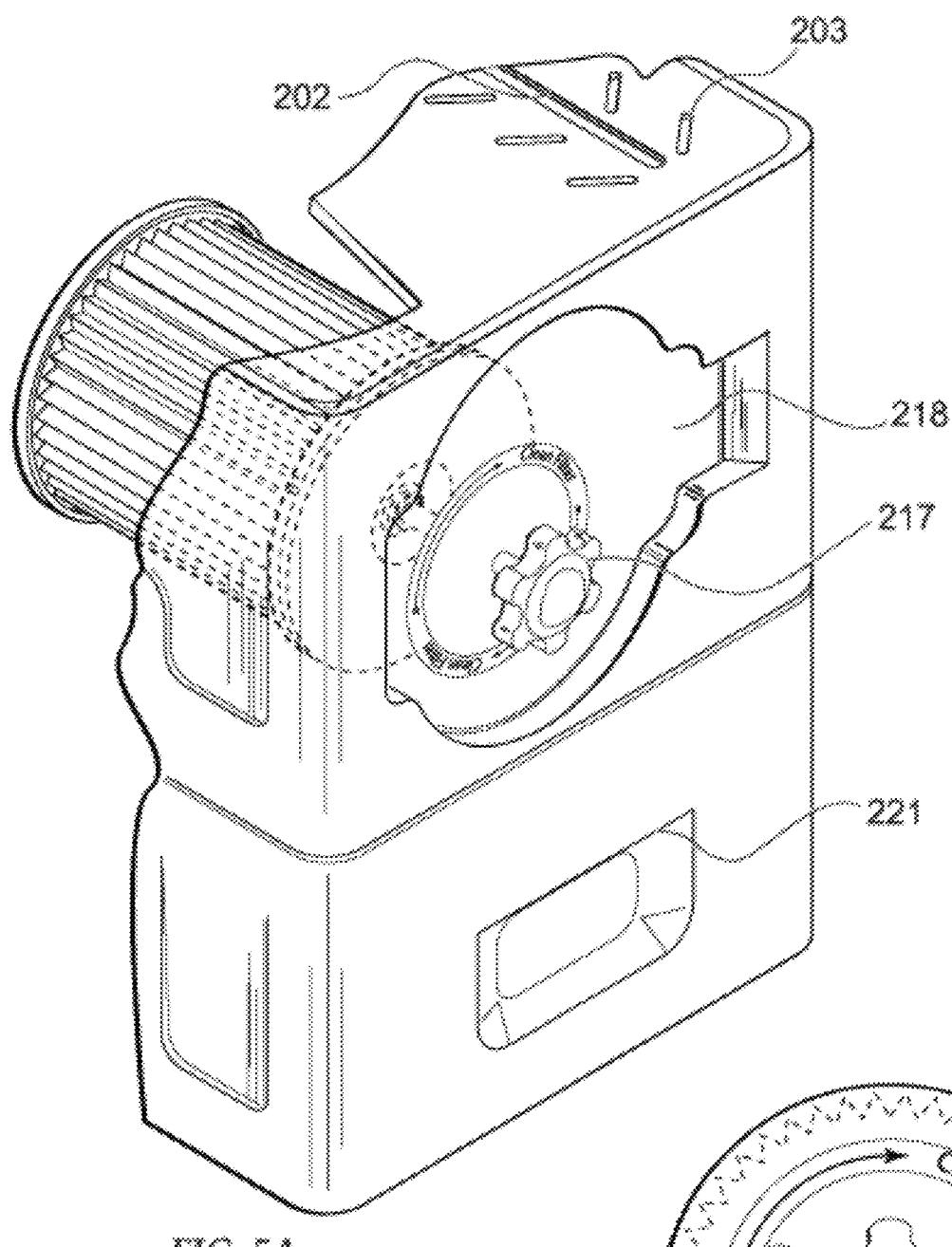
FIG. 5A is close up cut-away view of the perspective illustration shown in FIG. 1.
Figure 5B:
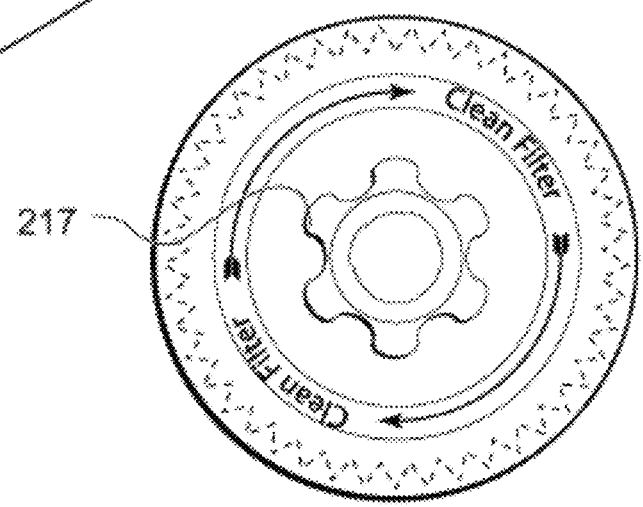
FIG. 5B is an end view of a filter cleaning knob of the present invention.

FIG. 5A shows a closer view of the embodiment 100 in the FIG. 1 illustration. The cut-a-way view also reveals a perspective illustration of the pleated cylindrical filter 311. A carve out in a lateral side of upper housing 210 is provided to accommodate access panel 218. Filter cleaning knob 217 is connected to the cylindrical filter 311 through the access panel 218 as further illustrated in FIG. 6. Access panel 218 can further be removed for maintenance and disassembly of the cylindrical filter 311 for replacement or deep cleaning. FIG. 5 shows an end view of filter cleaning knob 217.

Figure 6:
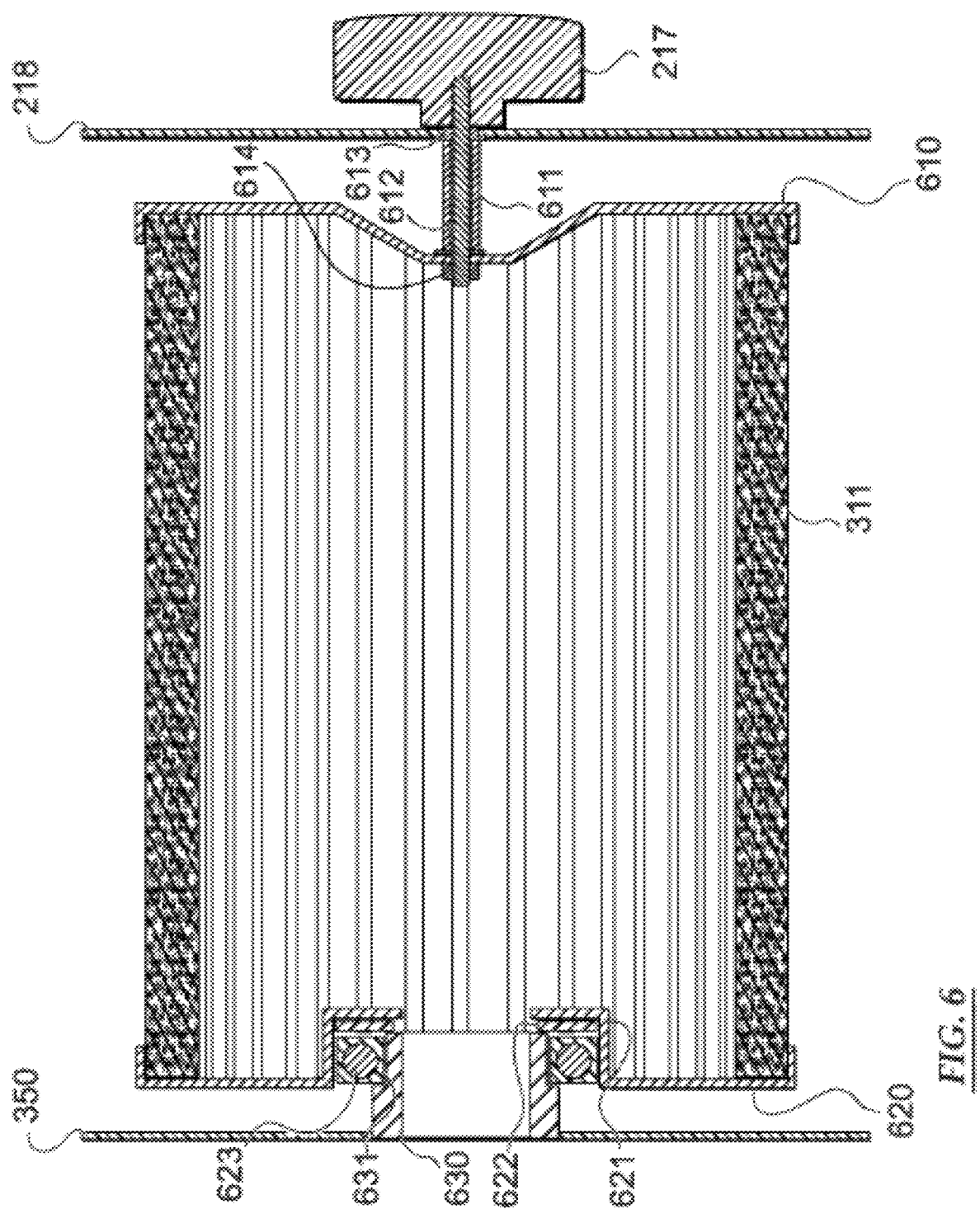
FIG. 6 is a schematical illustration of a cylindrical filter configuration embodiment of the present invention.

FIG. 6 illustrates more specifically how a cylindrical filter 311 connects to a vacuum apparatus 321 via vacuum tube 630 penetrating transverse wall 350. Initially, filter 311 is supported on it is sides by filter end caps 610, 620. Knob 217 connects to the first end cap 610 via coupler spacing 611 and connection bolt 612. Panel bushing 613 provides translational and rotational support to connection bolt 612. Hexagonal nut 614 secures the first filter end cap 610. At the other end, vacuum tube 630 has an annular rim 631 protruding therefrom and provides an abutment for bearing 623 also supported by gasket 622. Recess 621 in the second filter end cap 620 provides the space to connect bearing 623 around rim 631 as shown.

FIG. 7A and FIG. 7B provide a more detailed view of how upper housing 210 connects to lower dust bin 220. Rim 710 mates with groove 720 as shown for a secure connection upon closure of latch 222. An inside of the dust bin 220 shows an area where dust ultimately settles for later removal.

In another aspect of the disclosure, particular configurations of the aforementioned cylindrical filter 311 are contemplated. To this end, it should be noted that conventional air filters are inherently problematic because during their use they become saturated with dust and debris which at some point significantly reduces airflow. As previously disclosed herein, a filter pleat agitator mechanism (e.g., flap 312) may be included to periodically clean the aforementioned cylindrical filters in place by rotating these filters against the filter pleat agitator mechanism which would dislodge dust/debris and thus increase filter efficiency.

This rotational cleaning method, however, creates the problem of sealing the cylindrical filter to the intake port while still allowing it to rotate. In addition, it would be desirable for this rotating filter/seal to endure in an extreme environment of high temperature, high vibration, and micro fine dust. It would be further desirable that the seal material is chosen such that it does not damage the intake port during the rotation process or from the high vibration environment.

Figure 8:
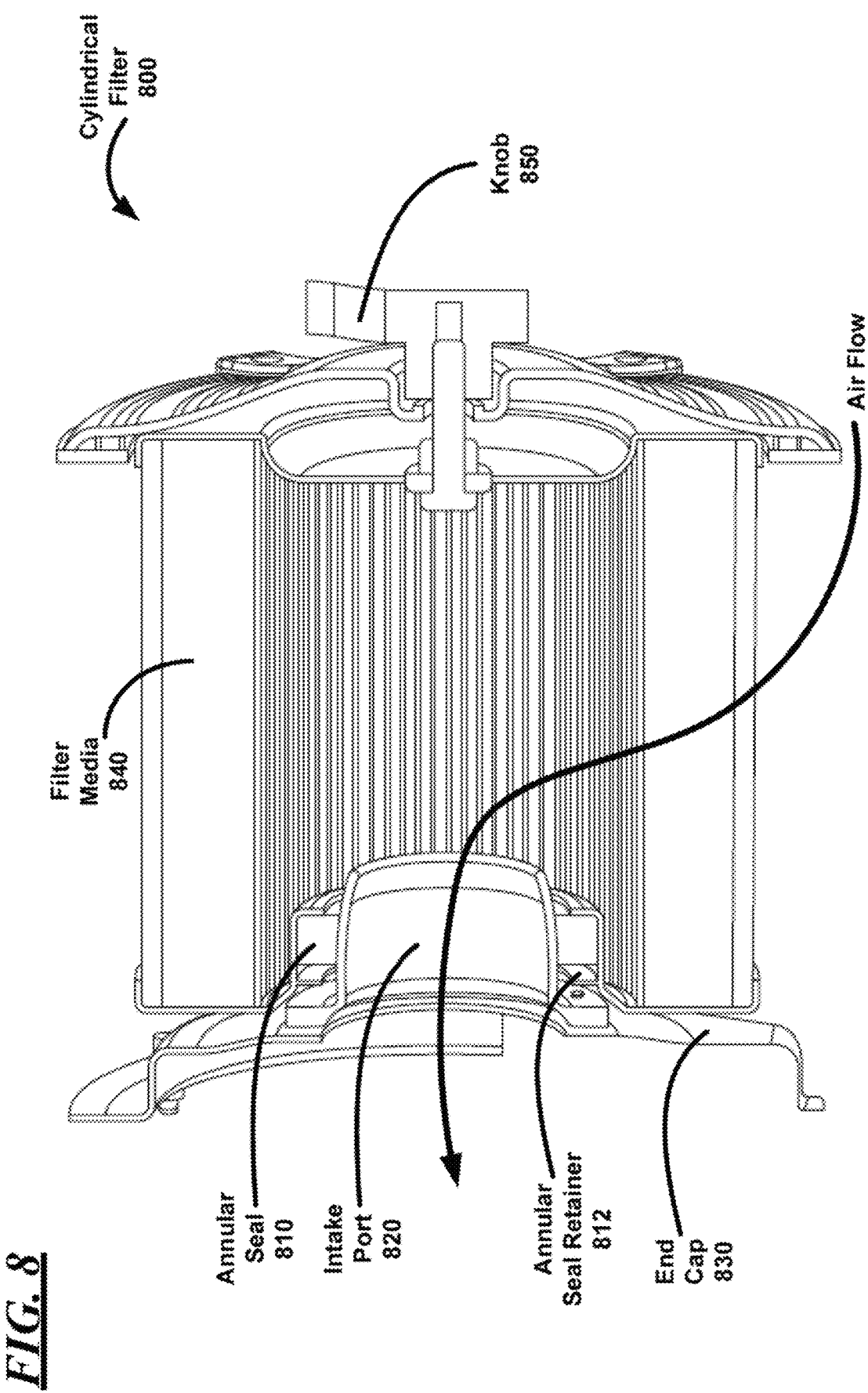
FIG. 8 illustrates a cylindrical filter in accordance with an aspect of the disclosure.
Figure 9:
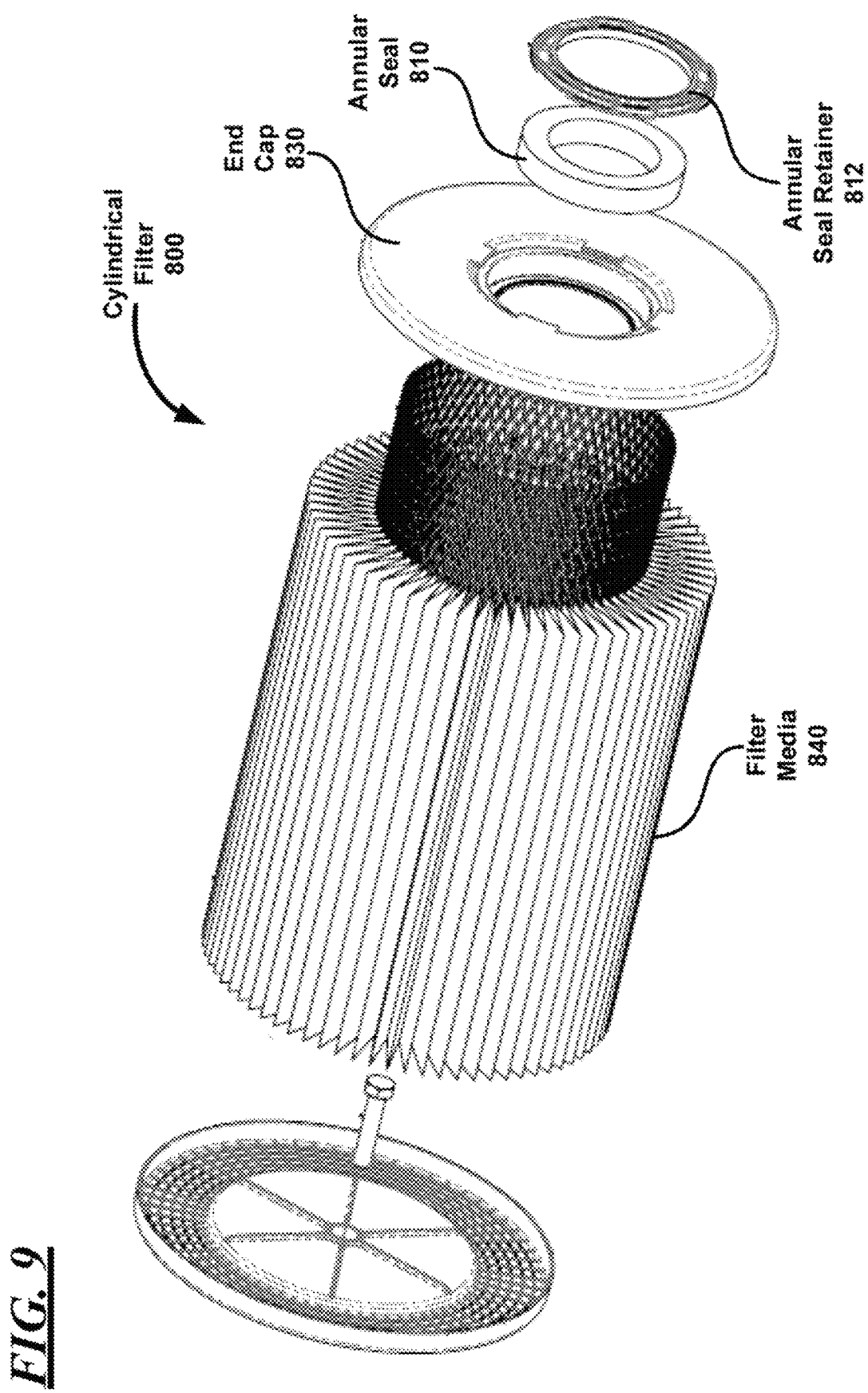
FIG. 9 illustrates an exploded view of the cylindrical filter illustrated in FIG. 8.

Referring next to FIGS. 8-9, an exemplary cylindrical filter with a seal configured for such extreme environments is provided in accordance with an aspect of the disclosure. As illustrated in FIG. 8, cylindrical filter 800 comprises an intake port 820, wherein intake port 820 may be configured to facilitate the illustrated air flow via a vacuum suction tube (e.g., vacuum suction tube 630) coupled to a vacuum device. It is also contemplated that cylindrical filter 800 further includes annular seal 810, wherein annular seal 810 is firmly embedded within end cap 830 by annular seal retainer 812.

Here, it should be appreciated that cylindrical filter 800 illustrated in FIGS. 8-9 is substantially similar to the aforementioned cylindrical filter 311, wherein the structure and functionality of cylindrical filter 800 is substantially similar to cylindrical filter 311. For instance, similar to cylindrical filter 311, it is contemplated that cylindrical filter 800 is configured to rotate against a filter pleat agitator mechanism (e.g., flap 312) for the purpose of cleaning dust and debris from the filter pleats of filter media 840 to increase filter efficiency. It is further contemplated that gasket 622 illustrated in FIG. 6, may be substantially similar to annular seal 810, wherein annular seal 810 is made of material configured to maintain a vacuum tight seal and allow for rotation of cylindrical filter 800 in an extreme environment of high heat, high vibration, and micro fine dust. Moreover, it would be desirable to manufacture annular seal 810 from a substance that most mitigates the damaging effects to the intake port 820 of cylindrical filter 800 during rotation and/or within a high temperature/vibration environment.

In a particular aspect, it contemplated that annular seal 810 is made of a spongy foam-like material. For instance, annular seal 810 may be made of silicone foam. Indeed, as is well known, silicone foam has a wide operating temperature (e.g., temperature range of −67° F. to 392° F. (−55° C. to 200° C.)), and provides excellent dust sealing capabilities (e.g., it is well known that open cell and closed cell silicone foam products can be used for sealing out dust with low compressive forces). As is also generally known, silicone foam products are typically manufactured from platinum cured, liquid silicone rubber. The raw compound is expanded and dispensed on a continuous casting line, then heat cured. The expansion process is controlled to create a range of products having different densities, softness/firmness and cell structures. Open cell silicone foams are widely used for cushioning, dust sealing or light water sealing. Closed cell silicone foam materials are used for outdoor gaskets, wash-down gaskets and resilient cushioning pads. Expanded silicone foam products have a firmness range from ultra soft to extra firm, allowing engineers to select the best product for their application.

During use, it is thus contemplated that cylindrical filter 800 yields various desirable aspects. For instance, it is contemplated that cylindrical filter 800 may be configured to rotate via knob 850 such that cylindrical filter 800 rotates against a filter pleat agitator mechanism (e.g., flap 312) for the purpose of cleaning the filter pleats filter media 840, and thus optimizing airflow. The material of annular seal 810 may also be particularly selected (e.g., silicone foam) so as to maintain a vacuum tight seal and allow for rotation in an extreme environment of high heat, high vibration, and micro fine dust, while being soft enough so as to not damage intake port 820. Namely, it is contemplated that annular seal 810 may be configured to function as a diaphragm between cylindrical filter 800 and intake port 820 to isolate vibration during use, and thus eliminating premature damage to intake port 820.

While the particular aspects herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

What is claimed is:

1. An apparatus comprising: a cylindrical filter housed in a filter chamber, wherein the cylindrical filter comprises a first filter end cap and a second filter end cap, and wherein the first filter end cap and the second filter end cap are respectively configured to secure opposite ends of the cylindrical filter; a filter cleaning knob configured to rotate the cylindrical filter; a filter cleaning flap secured to an interior wall of the filter chamber and configured to sequentially make contact with a plurality of pleated segments of the cylindrical filter as the filter cleaning knob is rotated; and a vacuum suction tube connected to a vacuum device wherein an annular rim protrusion extends from the vacuum suction tube, and wherein the annular rim protrusion is configured to mate with the second filter end cap via a gasket.

2. The apparatus of claim 1, further comprising:
a connection bolt configured to connect the filter cleaning knob to the first filter end cap, wherein the connection bolt penetrates a hole in an access panel; and
a panel bushing configured to provide translational and rotational support to the connection bolt.

3. The apparatus of claim 2, wherein the second filter end cap further comprises a bearing seat acting as an abutment to a bearing.

4. The apparatus of claim 1, further comprising a housing comprising an upper housing portion and a lower housing portion, wherein the upper housing portion is configured to house the cylindrical filter, and wherein the lower housing portion is configured to house a dust collection bin, the dust collection bin configured to receive dust removed from the plurality of pleated segments of the cylindrical filter by the filter cleaning flap as the filter cleaning knob is rotated.

5. The apparatus of claim 1, further comprising a vacuum suction tube configured to connect to a vacuum device on a first end and to the cylindrical filter on a second end to facilitate a coupling of the cylindrical filter and the vacuum device.

6. The apparatus of claim 1, wherein the gasket is configured to provide a seal between a vacuum suction tube and the cylindrical filter.

7. The apparatus of claim 6, wherein the gasket is an annular seal configured to provide a thermal break between an intake port and the cylindrical filter.

8. The apparatus of claim 6, wherein the gasket is an annular seal of foam-like material.

9. The apparatus of claim 8, wherein the foam-like material is silicone foam.

* * * * *